(12) United States Patent  
Gilula

(10) Patent No.: US 8,312,039 B2  
(45) Date of Patent: Nov. 13, 2012

(54) SYSTEM AND METHOD FOR STRUCTURED SEARCH

(76) Inventor: Mikhail Gilula, Foster City, CA (US)

( * ) Notice: Subject to any disclaimer, the term of this patent is extended or adjusted under 35 U.S.C. 154(b) by 614 days.

(21) Appl. No.: 12/365,875

(22) Filed: Feb. 4, 2009

(65) Prior Publication Data

US 2009/0182636 A1  Jul. 16, 2009

Related U.S. Application Data

(63) Continuation-in-part of application No. 11/833,218, filed on Aug. 2, 2007, now Pat. No. 8,103,654.

(60) Provisional application No. 60/929,414, filed on Jun. 26, 2007.

(51) Int. Cl.
*G06F 17/00* (2006.01)

(52) U.S. Cl. ......................... 707/769; 707/706; 709/217

(58) Field of Classification Search .................. 707/769, 707/706; 709/217
See application file for complete search history.

(56) References Cited

U.S. PATENT DOCUMENTS

| | | | |
|---|---|---|---|
| 7,127,414 B1 * | 10/2006 | Awadallah et al. | 705/26.8 |
| 2004/0143644 A1 * | 7/2004 | Berton et al. | 709/217 |
| 2006/0212362 A1 * | 9/2006 | Donsbach et al. | 705/26 |

* cited by examiner

*Primary Examiner* — Belix M Ortiz Ditren  
(74) *Attorney, Agent, or Firm* — Fernandez & Associates, LLP

(57) ABSTRACT

A system and method for structured search of information, including but not limited to, search for goods and services in e-commerce and mobile e-commerce, is disclosed. In some embodiments, the system comprises a plurality of heterogeneously structured data sources, a plurality of query objects that represent queries to the data sources and that are independent of the structure of the data sources, and a user interface configured to query the plurality of query objects.

20 Claims, 12 Drawing Sheets

```
BRAND string =[ MANUFACTURER ];
COPIER_B {...};
COPIER_C {...};
DUPLEX_PRINTING boolean;
FAX_MACHINE_B {...};
FAX_MACHINE_C {...};
LINK url;
MANUFACTURER string =[ BRAND ];
MAX_PRINT_RESOLUTION { MAX_PRINT_RESOLUTION_HORIZONTAL_DPI
                      ,MAX_PRINT_RESOLUTION_VERTICAL_DPI };
MAX_PRINT_RESOLUTION_HORIZONTAL_DPI numeric;
MAX_PRINT_RESOLUTION_VERTICAL_DPI numeric;
MAX_PRINT_SPEED_BLACK_PPM numeric
MAX_PRINT_SPEED_COLOR_PPM numeric;
MULTIFUNCTION_PERIPHERAL_B { BRAND
                            ,COPIER_B
                            ,FAX_MACHINE_B
                            ,LINK
                            ,MODEL
                            ,PICTURE_JPEG
                            ,PRICE_USD
                            ,PRINTER_B
                            ,SCANNER_B };
MULTIFUNCTION_PERIPHERAL_C { BRAND
                            ,COPIER_C
                            ,FAX_MACHINE_C
                            ,LINK
                            ,MODEL
                            ,PICTURE_JPEG
                            ,PRICE_USD
                            ,PRINTER_C
                            ,SCANNER_C };
PICTURE_JPEG file_jpeg
PRICE_USD money;
PRINTER_B { DUPLEX_PRINTING
           ,LINK
           ,MANUFACTURER
           ,MAX_PRINT_RESOLUTION
           ,MAX_PRINT_SPEED_BLACK_PPM
           ,MODEL
           ,PICTURE_JPEG
           ,PRICE_USD
           ,PRINTING_METHOD };
PRINTER_C { BRAND
           ,DUPLEX_PRINTING
           ,LINK
           ,MAX_PRINT_RESOLUTION
           ,MAX_PRINT_SPEED_BLACK_PPM
           ,MAX_PRINT_SPEED_COLOR_PPM
           ,MODEL
           ,PICTURE_JPEG
           ,PRICE_USD
           ,PRINTING_METHOD };
PRINTING_METHOD string;
SCANNER_B {...};
SCANNER_C {...};
```

FIGURE 3

| Metaobjects |||||
| Name | Type or Structure | Standard Instances / Values | Alteration Allowed | Implicit Inclusion |
| --- | --- | --- | --- | --- |
| ... | ... | ... | ... | ... |
| ADVERTISING_MOVIE_AVI | file_avi | no | n/a | yes |
| ADVERTISING_STRING | string | no | n/a | yes |
| OBJECT_SEMANTICS | string | object-specific | yes | no |
| OBJECT_VERSION | string | object-specific | no | yes |
| ... | ... | ... | ... | ... |

FIGURE 4

```
MULTIFUNCTION_PERIPHERAL_B
{ BRAND
 ,COPIER_B
 ,FAX_MACHINE_B
 ,LINK
 ,MODEL
 ,OBJECT_SEMANTICS = 'Multifunction Monochrome
Peripheral'
 ,PICTURE_JPEG
 ,PRICE_USD
 ,PRINTER_B
 ,SCANNER_B };
...
PRINTER_B
{ DUPLEX_PRINTING
 ,LINK
 ,MANUFACTURER
 ,MAX_PRINT_RESOLUTION
 ,MAX_PRINT_SPEED_BLACK_PPM
 ,MODEL
 ,OBJECT_SEMANTICS = 'Monochrome Printer'
 ,PICTURE_JPEG
 ,PRICE_USD
 ,PRINTING_METHOD };
PRINTER_C
{ BRAND
 ,DUPLEX_PRINTING
 ,LINK
 ,MAX_PRINT_RESOLUTION
 ,MAX_PRINT_SPEED_BLACK_PPM
 ,MAX_PRINT_SPEED_COLOR_PPM
 ,MODEL
 ,OBJECT_SEMANTICS = 'Color Printer'
 ,PICTURE_JPEG
 ,PRICE_USD
 ,PRINTING_METHOD };
```

FIGURE 5

| Query Object | Printer_B |

Object Semantics Monochrome Printer
Object Version 007-20070707

Price USD (numeric)

From ▶           To ▶

Manufacturer (alphanumeric) ▶ 1e

Model (alphanumeric) ▶ (*may enter a part of it*)

Printing Method (checkbox)

Laser ■ ✓
Inkjet ☐

Other (alphanumeric) ▶ (*may enter a part of it*)

Duplex Printing (radio button)

Yes ○
No ●

Max Print Speed Black, ppm (numeric) ▶ 14

Max Print Resolution, dpi (numeric) x (numeric)

▶ 600   x   ▶ 600

*Enhance Query?* (radio button)

Yes ●
No ○

*Advertisement Welcome?* (checkbox)

String ■ ✓
Movie ☐

FIGURE 6

```
SELECT *
FROM *
WHERE Contains(manufacturer, '*AnyCase('le')*')
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_black_ppm >= 14;
```

FIGURE 7

```
/********** Query #1 **********/
SELECT *
FROM multifunction_peripheral_b a
WHERE (Contains(a.brand, '*AnyCase('le')*')
  OR Contains(printer_b.manufacturer,'*AnyCase('le')*'))
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_ppm >= 14
;
            /********** Query #2 **********/
SELECT *
FROM multifunction_peripheral_c a
WHERE (Contains(a.brand,'*AnyCase('le')*')
       OR Contains(printer_c.brand,'*AnyCase('le')*'))
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_black_ppm >= 14
;
            /********** Query #3 **********/
SELECT *
FROM printer_b
WHERE Contains(manufacturer, '*AnyCase('le')*')
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_ppm >= 14
;
            /********** Query #4 **********/
SELECT *
FROM printer_c
WHERE Contains(brand, '*AnyCase('le')*')
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_black_ppm >= 14
;
```

FIGURE 8

| Query Object | Printer_C |
|---|---|
| Object Semantics | Color Printer |

| WHY BUY BLACK AND WHITE?! ||
|---|---|
| Price USD | 699.99 |
| Brand | Lexmark |
| Model | C510 Color Laser Printer |
| Printing Method | Laser |
| Duplex Printing | No |
| Max Print Speed Black, ppm | 30 |
| Max Print Speed Color, ppm | 10 |
| Max Print Resolution, dpi | |
| Horizontal | 2400 |
| Vertical | 2400 |

Link http://www.SuperDuperShopper.com/Lexmark-28S0200-C510-LASER/

| Query Object | Multifunction_peripheral_B |
|---|---|
| Object Semantics | Multifunction Peripheral, Monochrome |
| | FOUR IN ONE! A STEAL! |
| Price USD | 259.00 |
| Brand | Hewlett-Packard |
| Model | LaserJet 3015 All-in-one |
| | 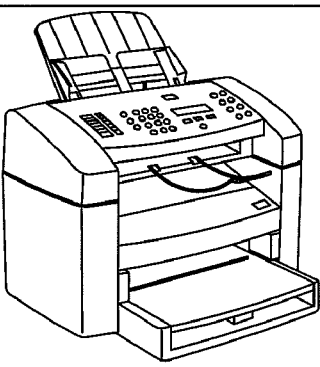 |
| Link | http://www.SuperDuperShopper.com/HP-Q2669A-LaserJet-All_in_One/ |
| Query Object | Printer_B |
| Object Semantics | N/A |
| Price USD | N/A |
| Manufacturer | N/A |
| Model | N/A |
| Printing Method | Laser |
| Duplex Printing | No |
| Max Print Speed Black, ppm | 14 |
| Max Print Resolution, dpi | |
| Horizontal | 2400 |
| Vertical | 2400 |
| Picture | N/A |
| Link | N/A |
| Query Object | Copier_B |
| | Not shown |
| Query Object | Fax_machine_B |
| | Not shown |
| Query Object | Scanner_B |
| | Not shown |

FIG. 11

SYSTEM AND METHOD FOR STRUCTURED SEARCH

CROSS REFERENCE TO RELATED APPLICATIONS

This application is a continuation-in-part of U.S. Non-Provisional Utility patent application Ser. No. 11/833,218 filed Aug. 2, 2007, which claims priority to U.S. Provisional Utility Patent Application Ser. No. 60/929,414 entitled "System and Method for Querying Heterogeneously Structured Data," filed Jun. 26, 2007.

FIELD OF THE INVENTION

The invention relates to systems and methods for structured search of information including but not limited to search for goods and services in e-commerce and mobile e-commerce.

BACKGROUND

Currently, the prevalent way of locating information on the Internet and the Intranets is the keyword based search, also known as unstructured search. In this paradigm the goal of the search is locating all web pages relevant to the keywords provided by a user. Along with the advantages this method has its drawbacks stemming from intrinsic imprecision of the keyword search often resulting in overwhelmingly voluminous responses. With time it becomes more and more of a problem since the number of websites grows much faster than the number of keywords. The problem is even more severe if mobile devices are used to conduct the search, not only because of smaller displays but also due to the "on-the-go" nature of mobile users who generally may need faster access to information.

In the e-commerce applications the unstructured search leads to inability to search for goods and services based on their features and technical characteristics that cannot be reduced just to the keywords. For example, there is no general way to search for all digital cameras with optical zoom not less than 10, and with not less than 10 megapixels, and weighting not more than 10 oz, and so on. Instead the customer needs to know the model name, or the brand name, etc., that would allow for the keyword search. Some e-commerce web sites try to alleviate this problem by providing classifications for the products but no classifications are able to substitute for the structured search that would bring those and only those products that satisfy the multiple requirements. As a result, millions and millions of hours are spent annually by the customers trying to locate the right merchandise or services, and to research and compare them in order to get the best deal.

Another problem with the unstructured search is the time it takes to sort through the voluminous responses generated by a keyword search. An ordinary keyword search typically generates such a large amount of information that the user never ends up seeing all of the search results. Server cycles are regularly wasted in generating vast amounts of search responses and information that is never ultimately reviewed or consumed by the user. Wasted server cycles increase response times for all internet users and slow down internet traffic speeds. As a result, internet infrastructure is not utilized to its full potential.

Therefore, there is a need for a system and method for structured search that would save time, increase precision, and better locate goods and services. The essence is that the process of searching for the best deal for the merchandise or service, etc., consists not in searching by keywords and going back and forth to compare the parameters in order to compile a shortlist of goods and services and then to look for the best deal, but in 1) conducting the structured search using the pertinent query object(s) and thus locating a shortlist much faster than by the keyword search; and 2) looking for the best deal and researching just a shortlist using either the keywords (now that the exact identification of what we want to buy is known), or just by following the links already provided as the result of the structured search itself.

BRIEF SUMMARY

A system and method for structured search is disclosed. The process consists of the following main steps: 1) locating the right query objects to satisfy the user's needs; 2) using query objects to formulate a structured query; 3) executing the structured query against specially created and maintained database or, in general case, against multiple heterogeneous data sources, and thus arriving at a shortlist of goods and services, and 4) looking for the best deal from the shortlist of the already found identities of goods and services. The system and method for structured search is conducted with pertinent query objects and thus locates the shortlist and best deals much faster than a conventional keyword search.

BRIEF DESCRIPTION OF THE DRAWINGS

For a detailed description of exemplary embodiments of the invention, reference is made to the accompanying drawings in which:

FIG. 3 shows an exemplary fragment of a thesaurus in accordance with embodiments of the invention;

FIG. 4 illustrates a table of exemplary metaobjects that may be included into query objects in accordance with embodiments of the invention;

FIG. 5 illustrates exemplary query objects after inclusion of the standard metaobjects of FIG. 4 in accordance with embodiments of the invention;

FIG. 6 illustrates an interactive graphical user interface used to generate a query in accordance with embodiments of the invention;

FIG. 7 shows the query of FIG. 6 reformulated using an exemplary structured query language in accordance with embodiment of the invention;

FIG. 8 illustrates sub-queries generated in response to the user input of FIG. 6 in accordance with embodiments of the invention;

FIG. 11 shows an exemplary instance of a query object produced in response to the query in FIG. 6 in accordance with embodiments of the invention;

NOTATION AND NOMENCLATURE

In the following discussion and in the claims, the terms "including" and "comprising" are used in an open-ended fashion, and thus should be interpreted to mean "including, but not limited to". Also, the term "couple, "couples," or "coupled" is intended to mean either an indirect or direct electrical or communicative connection. Thus, if a first device couples to a second device, that connection may be through a direct connection, or through an indirect connection via other devices and connections. In addition, the term "query object" or "query objects" should be construed as "any representation of a query to a data source that is independent of the schema of the data source." Also, the term "thesaurus" or "thesauri" should be construed as "any abstraction layer that facilitates the querying of heterogeneous data." For example, a thesaurus may comprise one or more query objects. Finally, the term "native query" is intended to mean any query to a data source that is dependent on the structure of the data source.

DETAILED DESCRIPTION

In this disclosure, numerous specific details are set forth to provide a sufficient understanding of the present invention. Those skilled in the art, however, will appreciate that the present invention may be practiced without such specific details. In other instances, well-known elements have been illustrated in schematic or block diagram form in order not to obscure the present invention in unnecessary detail. Additionally, some details have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise.

The following discussion is also directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be illustrative of that embodiment, and not intended to suggest that the scope of the disclosure, including the claims, is limited to that embodiment.

Figure 1:
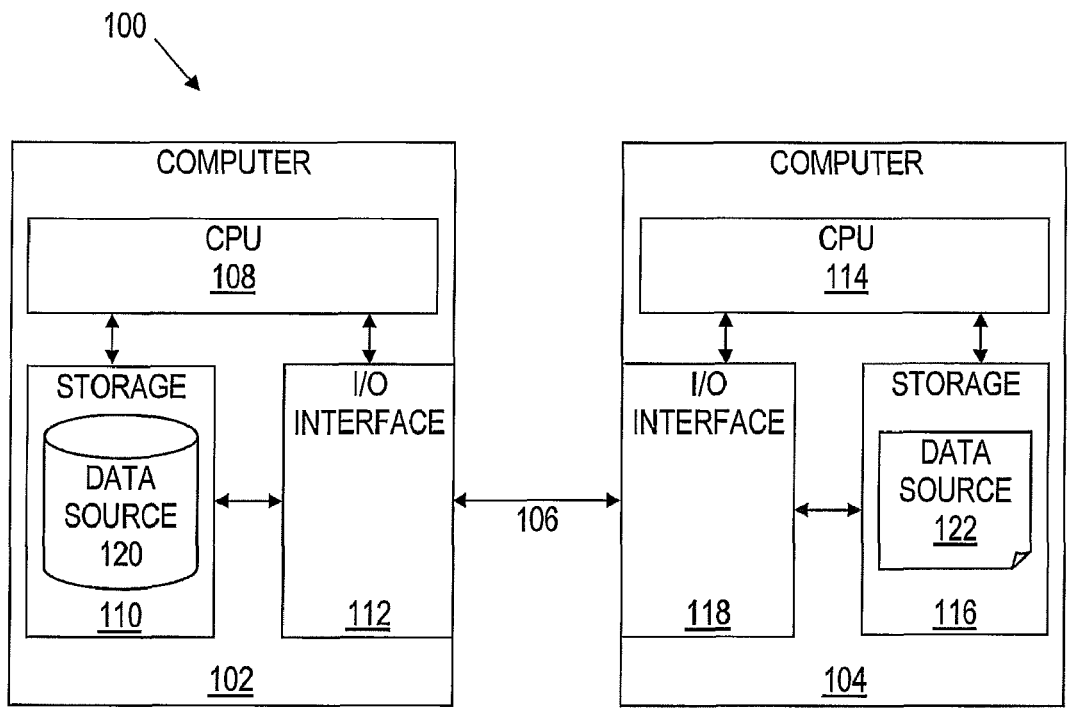
FIG. 1 illustrates a system constructed in accordance with embodiments of the invention.

FIG. 1 illustrates a system 100 constructed in accordance with embodiments of the invention. System 100 comprises a plurality of computers 102 and 104 coupled together through a communications channel 106. The computers 102 and 104 may be any type of computer system, such as a laptop computer, a personal computer, or a stand-alone computer operated as a server. Although not explicitly shown, the communications channel 106 may represent any type of computer network, such as the Internet, a local area network (LAN), and a wide area network (WAN), or any type of communications link created through wire-line or wireless technologies, such as Bluetooth, Infrared, and GSM.

As illustrated in FIG. 1, the computer 102 comprises a central processing unit (CPU) 108, a storage 110, and an Input/Output (I/O) interface 112. Similarly, the computer 104 comprises a CPU 114, a storage 116, and an I/O interface 118. The computers 102 and 104 may comprise the single CPUs 108 and 114 respectively, or may comprise a plurality of CPUs arranged in a configuration where parallel computing may take place. The CPUs 108 and 114 respectively couple to the storage 110 and 116, which respectively store a data source 120 and 122. The storages 110 and 116 may comprise any type of volatile and/or non-volatile memory, such as random access memory (RAM) and read only memory (ROM), or any other medium for storing information, such as a hard drive, universal serial bus (USB) flash drive, memory stick, cell phone, and iPod®.

The data sources 120 and 122 may comprise a database, a flat-file, an XML file, or any other data repository, such as a partition on a DVD or CD-ROM. The storage 110 and 116 respectively couple to the I/O interfaces 112 and 118 to exchange the information contained within the data sources 120 and 122 between the computers 102 and 104. Additionally, the data sources 120 and 122 can be of a particular merchandise or service structured data. Although only two computers and data sources are illustrated in FIG. 1, any number of computers and data sources may be used as desired.

Figure 2:
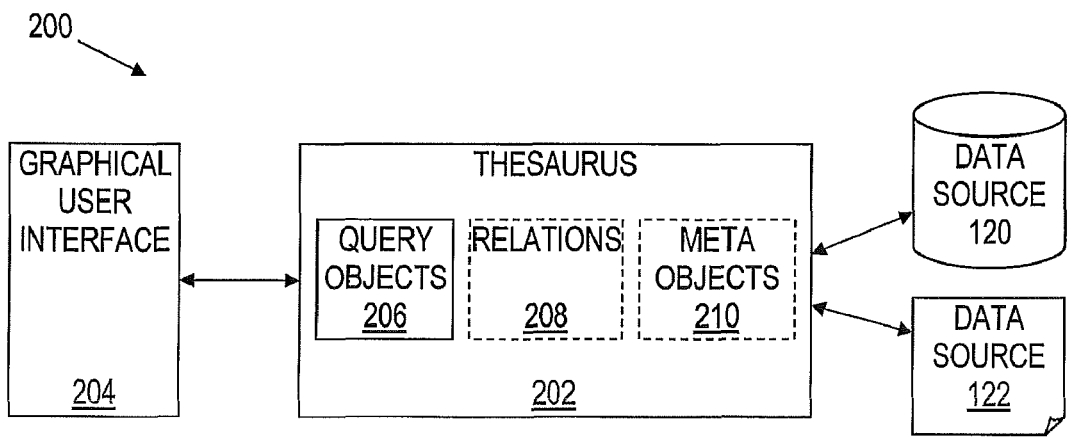
FIG. 2 depicts a framework configured in accordance with embodiments of the invention and used to query the heterogeneous data sources of FIG. 1.

FIG. 2 depicts a framework 200 configured in accordance with embodiments of the invention and used to query the data sources 120 and 122 of particular merchandise or service structured data of FIG. 1, or in the general case, query across multiple heterogeneous data sources. As illustrated in FIG. 2, the framework 200 comprises the data sources 120 and 122, a thesaurus 202, and a graphical user interface (GUI) 204. The thesaurus 202 comprises one or more query objects 206, and optionally, one or more relations 208 on the query objects and one or more metaobjects 210. The thesaurus 202 acts as an abstraction layer that facilitates the querying of the heterogeneous data sources 120 and 122. The GUI 204 may interact with the thesaurus 202 to query the data sources 120 and 122. Thus, a user of the GUI 204 may obtain useful information from the data sources 120 and 122 by way of the thesaurus 202 without knowledge of the underlying structure and organization of the data sources 120 and 122. As can be appreciated, the system 100 and framework 200 provide a flexible and scalable means of querying against specially created and maintained databases 120 and 122 of particular merchandise or service structured data, or in the general case, across multiple heterogeneous data sources. Although only two data sources 118 and 120 and one thesaurus 202 are illustrated in FIG. 2, any number of data sources and thesauri may be employed as desired. In addition, although the graphical user interface 204 is shown in FIG. 2, any type of user interface may be employed as desired, such as a command line interface, a virtual interface, an auditory interface, and a haptic interface.

FIG. 3 shows an exemplary fragment of a thesaurus in accordance with embodiments of the invention. The exemplary thesaurus fragment includes the following atomic query objects with their associated type: Brand (string), Duplex_printing (boolean), Link (URL—Uniform Resource Locator), Manufacturer (string), Max_print_resolution_horizontal_dpi (numeric), Max_print_resolution_vertical_dpi (numeric), Max_print_speed_black_ppm (numeric), Max_print_speed_color_ppm (numeric), Picture_jpeg (file_jpeg), Price_USD (money), and Printing_method (string). The query objects Brand and Manufacturer are defined as synonyms, or query objects that semantically equivalent. The relation of synonymy is shown by setting Brand equal to Manufacture and Manufacture equal to Brand in the exemplary thesaurus of FIG. 3. Although not explicitly shown, any other type of relationship may be formed between the query objects, such as the relation of antonymy, as desired.

The exemplary thesaurus of FIG. 3 includes the following non-atomic query objects: Copier_B, Copier_C, Fax_machine_B, Fax_machine_C, Max_print_resolution, Multifunction_peripheral_B, Multifunction_peripheral_C, Printer_B, Printer_C, Scanner_B, and Scanner_C. The object Max_print_resolution comprises the atomic objects Max_print_resolution_horizontal_dpi and Max_print_esolution_vertical_dpi. The object Multifunction_peripheral_B comprises the atomic objects Brand, Link, Model, Picture_jpeg, and Price_USD, and also the non-atomic objects Copier_B, Fax_machine_B, Printer_B, and Scanner_B. The object Multifunction_peripheral_C comprises the atomic objects Brand, Link, Model, Picture_jpeg, and Price_USD, and also the non-atomic objects Copier_C, Fax_machine_C, Printer_C, and Scanner_C. The object Printer_B comprises the atomic objects Duplex_printing, Link, Manufacturer, Max_print_speed_black_ppm, Model, Picture_jpeg, Price_USD, Printing_method, and also the non-atomic object Max_print_resolution. The object Printer_C comprises the atomic objects Brand, Duplex_printing, Link, Model, Picture_jpeg, Max_print_speed_black_ppm, Max_print_speed_color_ppm, Price_USD, and Printing_method, and also the non-atomic object Max_print_resolution. Although not explicitly shown, the query objects Copier_B, Copier_C, Fax_machine_B, Fax_machine_C, Scanner_B, are Scanner_C comprise other query objects.

As can be appreciated, the exemplary thesaurus of FIG. 3 could be used in the printing industry with data sources belonging to parties in the printing industry's value chain, such as manufactures, suppliers, and distributors. Because the query objects are schema independent, the exemplary thesaurus may be used with any number of specially created and maintained databases 120 and 122 of particular merchandise or service structured data, or in the general case, discrete and heterogeneous data sources. For example, the thesaurus may be used to amalgamate three heterogeneous data sources, one from a printer manufacturer, one from a copier distributor, and one from a scanner reseller. Thus, the thesaurus may increase efficiency in the printing industry by providing a single interface to data sources that were once discrete and isolated.

The thesaurus in FIG. 3 is also an illustrative fragment of a complete thesaurus. In accordance with embodiments of the invention, a thesaurus may comprise any number of query objects and synonyms as desired. As can be appreciated, Printer_B, Printer_C, Scanner_B, Scanner_C, Copier_B, Copier_C, Fax_machine_B, Fax_machine_C, Multifunction_peripheral_B, and Multifunction_peripheral_B represent different classes of printers, scanners, copiers, fax machines multifunctional peripherals respectively. These different classes may be used to integrate heterogeneous objects that logically represent similar objects. For example, Printer_B and Printer_C both represent printers, but Printer_B is a monochrome printer, whereas Printer_C is a color printer, as evidenced by the Max_print_speed_color_ppm field in the Printer_C query object. Thus, the organization of the thesaurus itself may facilitate the querying of specially created and maintained databases 120 and 122 of particular merchandise or service structured data, or in the general case across multiple heterogeneous data sources, by providing independent classes of query objects. In addition, although the exemplary thesaurus is used with printing related objects, any type of data object may be used as desired.

FIG. 4 illustrates an exemplary table of metaobjects that may be included into query objects in accordance with embodiments of the invention. As shown in FIG. 4, the atomic metaobject Advertising_movie_avi has type of file_avi, does not allow standard values specified, and may be implicitly included into other objects. The atomic metaobject Advertising_string has type of string, does not allow standard values specified, and may be implicitly included into other objects. The atomic metaobject Object_semantics has type of string, allows object-specific standard values and their alteration in responses to queries, and does not allow implicit inclusion into other objects. The atomic metaobject Object_version has type of string, allows object-specific standard values but does not allow their alteration, and allows implicit inclusion into other objects. Although four metaobjects are shown in FIG. 4, any number and type of metaobjects may be used as desired.

FIG. 5 illustrates exemplary query objects after inclusion of the standard metaobjects of FIG. 4 in accordance with embodiments of the invention. As shown in FIG. 5, three different object-specific instances of the Object_semantics metaobject are included into three of the query objects. The value of the Object_semantics metaobject in the Multifunction_peripheral_B query object is "Multifunction Monochrome Peripheral"; the value of the Object_semantics metaobject in the Printer_B query object is "Monochrome Printer"; and the value of the Object_semantics metaobject in the Printer_C query object is "Color Printer". As can be appreciated, the metaobjects describe semantics of query objects for query formulation that are produced and included in response to user queries. The metaobjects facilitate the querying of query objects using standard metaobject instances, which may be more informative than the presumably short names of the query objects alone. For example, in the example above, the metaobject reveals the type of printer with more detail than the query object name alone. Thus, the inclusion of metaobjects produces more user-friendly and useful results than standard querying techniques. In addition, the metaobjects may add functionality to a system employing embodiments of the invention. For example, the metaobject Advertising_movie_avi facilitates the inclusion of advertisements and promotional material with a user query. Presenting advertisements to the user, in addition to the results of the user query, increases the functionality of the system by permitting advertisers to associate advertising material with the queries.

FIG. 6 illustrates an interactive graphical user interface in accordance with embodiments of the invention. For exemplary purposes, the interface uses a representation of the Printer_B query object of FIG. 5. On the top of the interface, the Printer_B query object and the Object_semantics and Object_Version metaobjects are shown. The Object_semantics metaobject has a value of "Monochrome Printer", and the Object_Version metaobject has a value of "007-200070707". A user may utilize the various input fields on the interface to formulate a query. Particularly, FIG. 6 illustrates an example where a user wishes to find all laser printers containing string of symbols 'le' in the manufacturer field, having no duplex mode, allowing a printing speed in black not less than 14 ppm, and allowing a printing resolution not less than 600×600 dpi. The bottom of the interface includes two user preferences. The first user preference determines if a query enhancement should be performed, and when answered positively, will allow matching response to come not only in the form of the Printer_B query object instances but also in the form of instances of other objects that satisfy the search criteria. The second user preference determines what type of advertisement should be included in the response. The two available options are an advertising string or an advertising movie, which are derived from the metaobjects Advertising_string and Advertising_movie_avi of FIG. 4. Although two user preferences are shown in FIG. 6, any number of user preferences may be included as desired. In addition, the interface depicted in FIG. 6 is only exemplary of an interface used to query a query object. The interface may be constructed using one or more of query objects contained in the thesaurus as desired.

As can be appreciated, the layout and type of interface may be changed as desired by adding and removing various types of user inputs, such as checkboxes, radio buttons, drop down boxes, and text entry fields. Moreover, in at least some embodiments, the interface may utilize more than one object. For example, the interface may dynamically create the appropriate user inputs for multiple query objects through programming logic and return results from these query objects as specified by the user search criteria. Such embodiments enable users to quickly find more than one object, e.g., a color printer and a scanner, through the same interface. In addition, although a graphical user interface is used in FIG. 6, any type of user interface may be employed, such as a command line interface, a virtual interface, an auditory interface, and a haptic interface.

FIG. 7 shows the query of FIG. 6 reformulated using an exemplary structured query language in accordance with embodiments of the invention. Like queries formulated using a relational structured query language, such as SQL, the query in FIG. 7 comprises three clauses: SELECT, FROM, and WHERE. However, the exemplary semantics differs from the standard SQL semantics to accommodate the potentially complex structure of the query objects. This is in direct contrast to the "flatness" of the relational tables served by the standard SQL. Another principle difference consists in the source-independent nature of the query in FIG. 7, whereas standard SQL queries always relate to specific databases, specific tables or views of the databases, and specific attributes of the tables or views. In particularly, the SELECT clause of the query in FIG. 7 relates to the query objects rather than the attributes of relational tables. Thus, the asterisk in the SELECT clause means "all complete instances of all query objects specified by the FROM clause that satisfy the WHERE clause" versus the standard SQL meaning of "all columns of a table specified by the FROM clause that satisfy the WHERE clause". Accordingly, the FROM clause also relates to query objects and differs significantly from standard SQL, which does not allow an asterisk in the FROM clause. In the example of FIG. 7, the asterisk in the FROM clause means "any query object of the thesaurus." This formulation reflects the user preference of query enhancement in FIG. 6. If no query enhancement was desired by the user, only the query object or objects used to generate the interface would be queried, in this case Printer_B.

The WHERE clause of the query in FIG. 7 is a compound predicate formed using several elements. First, a function AnyCase( ) specifies that the string constant 'le' inputted by the user in the interface of FIG. 6, as well as the string constant 'laser', must be considered independently of the case of the letters (i.e., upper or lowercase). This function, surrounded by asterisks on the both sides, forms a pattern expression indicating that the 'le' constant may reside in any place of the containing string. Second, a predicate "equals to 'laser' in any case letters" is performed on the Printing_method atomic query object. Third, a predicate Contains( ) specifies that the string values of the Manufacturer atomic object must include string 'le' in any case. Fourth, a predicate "greater or equals 600" is performed on the numeric values of the atomic query objects Max_print_resolution_horisontal_dpi and Max_print_resolution_vertical_dpi. Fifth, a predicate "equals 0" is performed on the boolean values of the atomic object Duplex_ printing. Finally, a predicate "greater or equals 14" is performed on the numeric values of the Max_print_speed_black_ppm atomic object. This compound predicate is the translation of the user query in FIG. 6 to an exemplary structured query language.

FIG. 8 illustrates four sub-queries generated in response to the user input of FIG. 6 in accordance with embodiments of the invention. These sub-queries are alphabetically ordered and formulated using an exemplary query language and illustrate the query enhancement feature specified by the user in FIG. 6. The set of sub-queries is derived from the reformulated query of FIG. 7 using the thesaurus of FIG. 3. Query #3 is directed to the Printer_B query object because Printer_B was the query object used to generate the interface of FIG. 6. This query is produced regardless of whether query enhancement was chosen by the user.

Query #4 is directed to the Printer_C query object because Printer_C comprises all query objects in the WHERE clause of FIG. 7 except Manufacturer. However, the Printer_C query object does contain the Brand synonym for Manufacturer, as defined by the thesaurus of FIG. 3. Thus, a sub-query for the Printer_C query object must be generated. The WHERE clause of Query #4 is identical to the WHERE clause of Query #3 except that Manufacturer is replaced by Brand, again in accordance with the thesaurus of FIG. 3.

Query #2 is directed to the Multifunction_peripheral_C query object because Multifunction_peripheral_C comprises the Printer_C query object as defined by the thesaurus of FIG. 3. The WHERE clauses of Queries #2 and #4 differ because besides the Brand query object contained by Printer_C, Multifunction_peripheral_C contains its own Brand query object as defined by the thesaurus of FIG. 3. Therefore, the predicate Contains( ) must be duplicated to accommodate the second Brand query object. In order to distinguish between the two instances of the Brand query object, Query #2 qualifies each of the two Brand occurrences with the name of the parent query object and the OR logical operator is used to combine the two Contains( ) predicates. Since the name of the Multifunction_peripheral_C query object is relatively long, an alias "a" is defined within the FROM clause which is then used in the WHERE clause to reference this object.

Finally, Query #1 is directed to the Multifunction_peripheral_B query object because Multifunction_peripheral_B comprises the Printer_B query object as defined by the thesaurus of FIG. 3. Query #1 is built analogously to Query #2 with the only variation being that Printer_B contains the Manufacturer query object and Multifunction_peripheral_B contains its synonym, Brand. Therefore, a Contains( ) predicate is added for the Brand query object in addition to the Contains( ) predicate for the Manufacturer query object, as done in Query #3. Since no more semantically distinct queries can be derived using the query of FIG. 7 and the thesaurus of FIG. 3, the sub-query generation process is complete.

Figure 9:
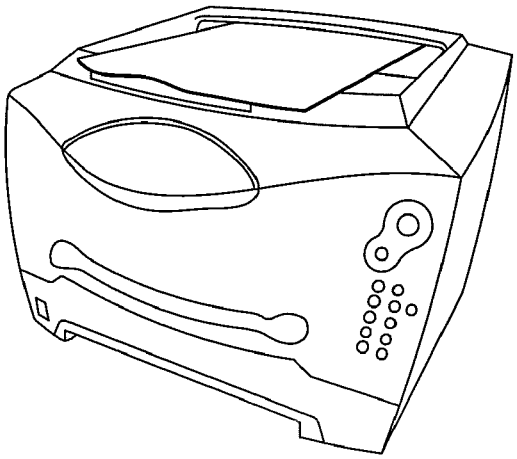
FIG. 9 illustrates an exemplary instance of a query object produced in response to the query in FIG. 6 in accordance with embodiments of the invention.
Figure 10:
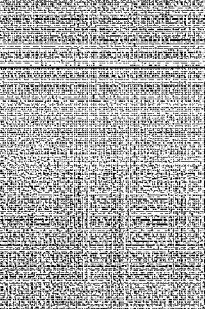
FIG. 10 depicts an exemplary instance of a query object produced in response to the query in FIG. 6 in accordance with embodiments of the invention.

FIGS. 9, 10, and 11 depict exemplary responses to the user query of FIG. 6 in accordance with embodiments of the invention. In particular, FIG. 9 represents an exemplary instance of the Printer_B query object produced as a response to Query #3 of FIG. 8. Notice that the query object comprises an instance of the Advertising_string metaobject ("BEST VALUE!"), as indicated by the user in FIG. 6. The darkened elements in FIG. 9 illustrate the values conforming to the WHERE clause of Query #3 of FIG. 8. The name of the Picture_jpeg atomic object is not shown. The metaobject Object_version is also not shown.

FIG. 10 depicts an exemplary instance of the Printer_C query object produced as a response to Query #4 of FIG. 8. Notice that the query object comprises an instance of the Advertising_string metaobject ("WHY BUY BLACK AND WHITE!"), as indicated by the user in FIG. 6. The darkened elements in FIG. 10 illustrate the values conforming to the WHERE clause of Query #4 of FIG. 8. The name of the Picture_jpeg atomic object is not shown. The metaobject Object_version is also not shown.

FIG. 11 shows an exemplary instance of Multifunction_peripheral_B produced as a response to Query #1 of FIG. 8. Notice that the query object comprises an instance of the Advertising_string metaobject ("FOUR IN ONE! A STEAL!"), as indicated by the user in FIG. 6. The darkened elements in FIG. 11 illustrate the values conforming to the WHERE clause of Query #1 of FIG. 8. The name of the Picture_jpeg atomic object is not shown. Metaobject Object_version is not shown. The instances of Copier_B, Fax_machine_B, and Scanner_B query objects are also not shown.

Figure 12:
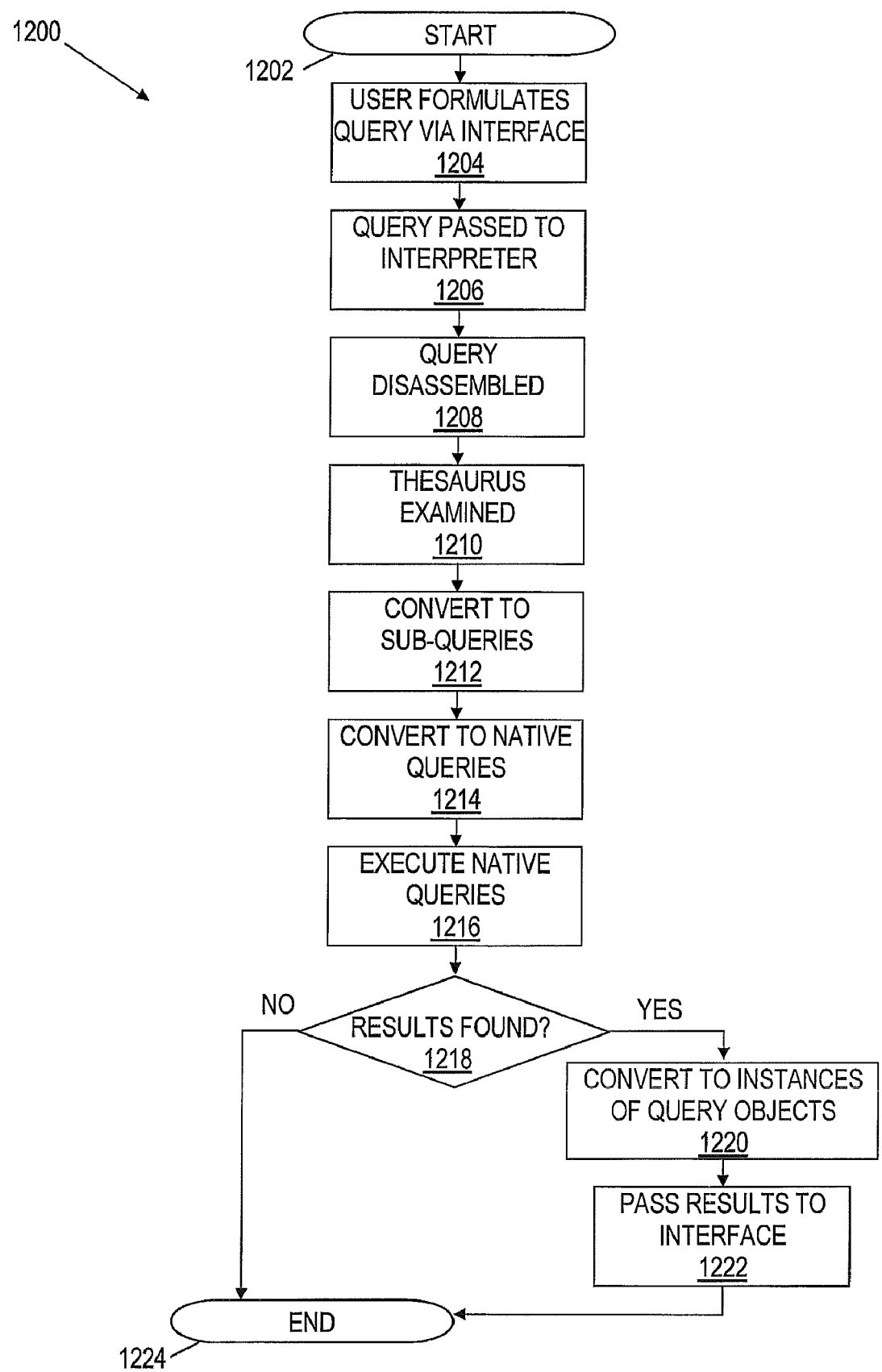
FIG. 12 illustrates an exemplary process of querying specially created and maintained databases of particular merchandise or service structured data, or in the general sense heterogeneous data sources in accordance with embodiments of the invention.

FIG. 12 illustrates an exemplary process 1200 of querying specially created and maintained databases 1204 of particular merchandise or service structured data, or in the general case across multiple heterogeneous data sources in accordance with embodiments of the invention. The process begins (1202) when a user of an interface formulates a query to the data sources (1204). The query is then passed to an interpreter (1206) where the query's syntax is evaluated for a proper format. The query is then disassembled into discrete parts (1208). This disassembly process may entail dividing the query into clauses, as performed in FIG. 7. Based on the results of the disassembly, the thesaurus is examined for query objects, metaobjects, and relations between the query objects that are associated with the query (1210). Utilizing the thesaurus, the query is then converted to one or more sub-queries (1212). For each of the data sources, the sub-queries are then converted into native queries (1214). The native queries are executed against the respective data sources (1216) and if matching results are found (1218), these results are converted to the instances of the query objects (1220) and then passed to the interface (1222) where the user may perceive them. After the results are passed to the interface, or if no results are found in step 1218, the process ends (1224).

Figure 13:
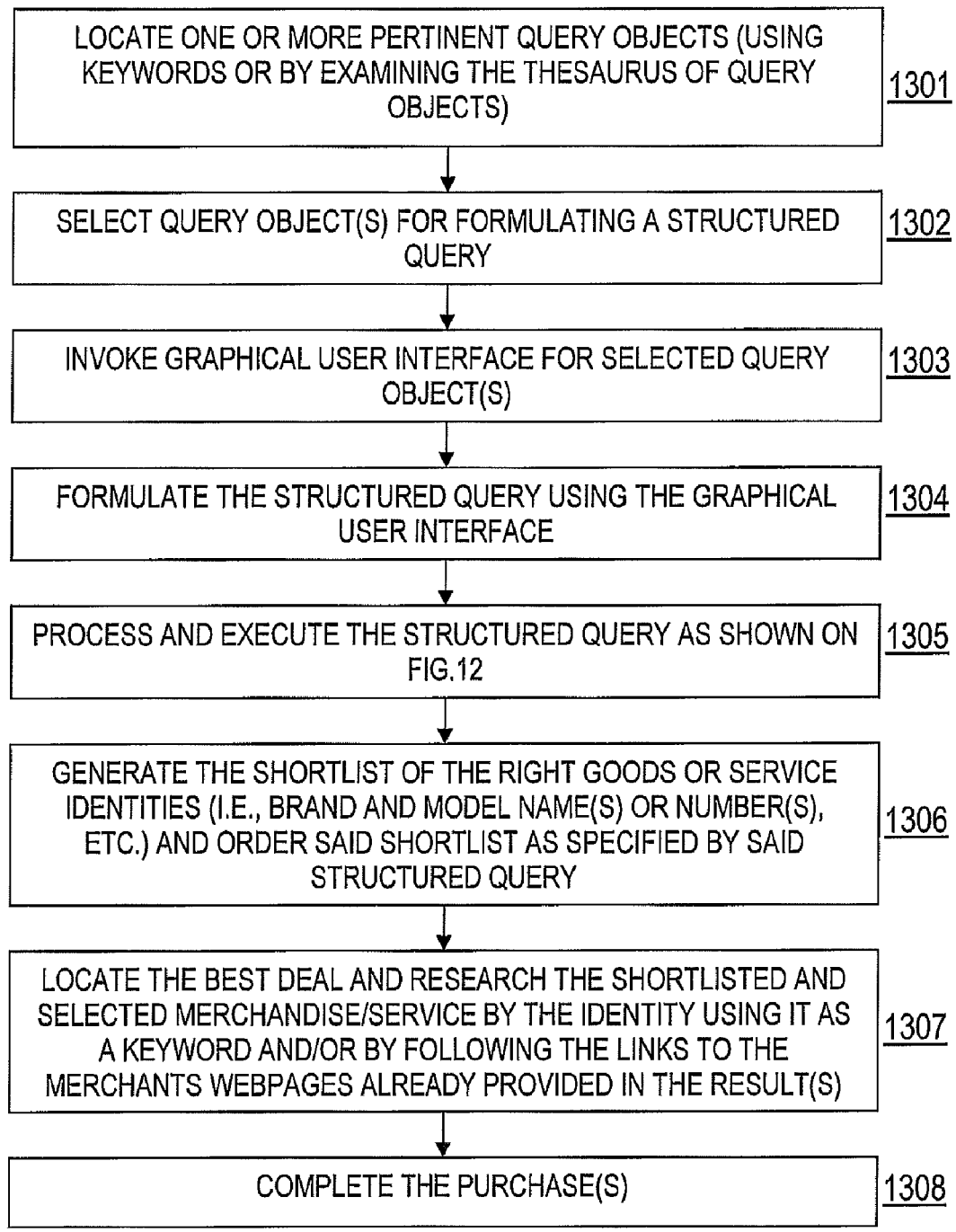
FIG. 13 illustrates an exemplary process for structured search for goods and services in e-commerce and mobile e-commerce.

FIG. 13 illustrates an exemplary process for structured search for goods and services in e-commerce and mobile e-commerce. The process consists of initially locating one ore more pertinent query objects by using keywords or by examining the thesaurus of query objects 1301. Next, the query objects are selected for formulating a structured query 1302. Thereafter, a graphical user interface is invoked for the selected query objects 1303. Then, a structured query is formulated using the graphical user interface 1304. Next 1305, in accordance with the steps in FIG. 12, the structured query is processed and executed by being passed to an interpreter, the structured query is disassembled, the thesaurus is examined, the structured query is converted to sub-queries, the structured query is further converted to native queries, and finally the native queries are executed. If no results are found, the process ends. However, if results are found, the structured query is converted to instances of query objects, and then the results are passed to an interface. Thereafter, a shortlist of the right goods or service identities is generated 1306, i.e., brand and model name, number, etc., and said identities of goods or service are ordered as specified by said structured query. Ordering 1306 as specified by said structured query comprises arranging, sequencing, or presenting the identities of goods or services by relevancy context or user desires inherent in said structured query. Next, the best deals are located 1307 and the shortlisted and selected merchandise or services are researched by an identity using the identity as a keyword and/or by following links to the merchant web pages already provided in the results of the structured search. Finally, the purchase is completed 1308.

In at least some embodiment, the user formulates a structured query in a structured process. The user provides data input into an interactive graphical user interface. FIG. 6. Illustrates such graphical user interface in accordance with embodiments of the invention. The user provides data input by populating various input fields on the interface to formulate a desired query. User data input may be text, character strings, numeric figures, check boxes, radio buttons, or drop-down menus. The query is reformulated into a reformulated query using exemplary structured query language. Furthermore, sub-queries are derived from the reformulated query using a thesaurus. The graphical user interface adaptively reacts to user input and presents data input fields in response to user input. Related and commonly associated data input fields provide the user with enhanced query formulation. In the exemplary representation of the Printer_B query object of FIG. 5, the graphical user interface of FIG. 6 may present the data input field checkboxes for Printing Method as "Laser," "Inkjet," "Digital Photo," or "Multifunction," etc. in response to the user data input "Manufacturer." However, only related and commonly associated data input fields are provided such that only certain printing methods are provided for a given manufacturer.

A computer searches a specially created and maintained database of particular merchandise or service structured data with a plurality of query objects that satisfy the user formulated structured query. A database of particular merchandise and service of structured data can be specially built and maintained in order to provide for the structured search in accordance with using pertinent query objects and locating a shortlist of goods and services much faster the by a keyword search. The database may be a localized database, a networked database accessed via a local area network (LAN), or a remote database accessed via a wide-area network (WAN). The database comprises data structures that are pulled from resources across the world wide web. Some embodiments of the data structures may comprise consumer product specifications and technical data, professional services and pricing models, media providers and types of content, or geographical locations with available infrastructures for specific types of commercial activity. One embodiment of such data structures may be a list of all types of digital cameras manufactured by commercial vendors and their associated product specifications and technical data. In yet another embodiment of such data structures may be a list of all types of information technology data storage consulting companies and their associated pricing models.

A query object is comprised of a set of specifications defining a target query object. The set of specifications are a data structure representing varying data points, data sets, data configurations, matrices, or statistical models which all describe the target query object. A certain target query object may be defined by various configurations of a set of specifications, with a lower bound of some minimum data structure needed in order to represent the target query object specification and an upper bound data structure representing the complete target query object specification. Therefore, a subset of variant query objects may define a target query object. Furthermore, a thesaurus comprised of a number of query objects and synonyms facilitates defining said target query objects by a subset of variant query objects.

The computer search of a database with a plurality of query objects results in the graphical user interface obtaining a plurality of target query objects. The plurality of target query objects represents a shortlist of identities of goods or services. In one embodiment, the shortlist represents specific objects sought after by the user query. In yet another embodiment, the short list may comprise a list of desired consumer products, professional services, media content providers or geographical locations. For example the short list may comprise desired digital cameras sought after by the user's formulated query.

The computer executes the structured query against specially created and maintained databases 120 and 122 or across multiple heterogeneous data sources with the plurality of target query objects in order to obtain information or characteristic information about target query objects. A query object comprises a representation of a query to a data source that is independent of the schema of the data source. Heterogeneous data sources may be horizontally integrated across interrelated entities. For example, the heterogeneous data sources may be commercial entities, such as Amazon.com, Bestbuy.com, eBay.com, or shopping.Yahoo.com, etc., government entities, such as Science.gov, Darpa.mil, Nasa.gov., Nist.gov, or Nsf.gov, etc., or networked data storage file servers comprising application data, documents, emails, photographic media, audio media, or video media, etc. Heterogeneous data sources may also be vertically integrated entities such as commercial retailers, manufacturers, OEM suppliers, service and support providers, and value added re-sellers in a specified industry or market segment.

Searching and executing structured queries against specially created and maintained databases 120 and 122 or across heterogeneous data sources may be facilitated by accessing ordinary public domains, interfaces, channels, ports, or network sockets. The search may also be carried out by accessing a dedicated IP-address, provisioned network socket, backdoor interfaces, secure authenticated HTTP sessions, or other non-public pathway to the data source. Agreements may be made with data source owners in order to more efficiently access, connect and search such data sources via the system and method described herein.

Information or characteristic information about target query objects obtained by the computer will depend on inherent features, elements, traits, or properties of the specific objects sought by the user structured query. For example, such characteristic information may be prices and how to buy a desired object, however, the embodiments of the information or characteristic information will ultimately depend on the initial user structured query and such embodiments are not limited to any specific qualitative or quantitative designations.

Information resulting from executing structured queries against specially created and maintained databases 120 and 122 or the search across heterogeneous data sources is presented to the user via the graphical user interface in a format that allows comparison. Depending on the type of structured query, there may be optimal means for presenting characteristic information in order to aid user comparison of specific objects sought after by the user structured query. In one embodiment, a short list of desired consumer products and may be listed in columns with a row for each product beginning with an identification or name of the product, an image of the product, price, source where available, shipping charge, and warranty, etc. In another embodiment, professional services and pricing models may be presented in a tiered graphical representation, ranking the quality of the associated providers. In another embodiment, a short list of desired media providers may be presented in a grid with snapshots of the provider's website, and symbols representing types of available content. In yet another embodiment, a short list of geographical locations with available infrastructures for specific types of commercial activity may be presented with a two-dimensional (2D) or three-dimensional (3D) interactive map of the locations and associated infrastructures. Furthermore, information may be presented to the user in real-time.

Agreements may be made with designated commercial entities for pushing or forwarding internet traffic to associated websites from a host site for the graphical user interface of the presently described system and method. Advertisements may also be accurately targeted in the graphical user interface in response to the short list of specific objects sought after by the user structured query. Advertisements may be targeted to the market demographic of buyers and users of professional digital cameras in accordance with the embodiments described above. Types of advertisements utilized in the system may be traditional banner ads, media-rich banner ads, pop-up ads, floating ads, or cursor ads.

In at least one embodiment, the method and system for structured search of information includes a search for goods and services in e-commerce. The structured search allows a search for a particular product based upon technical features and specifications. A user formulates the structured query using the graphical user interface by entering desired technical features and specifications. For example, in formulating a structured search for a laptop computer, the user enters the type of operating system, screen size, CD, DVD or Blu-ray, memory size, hard drive size, video card specifications, sound card specifications, wireless options such as IEE 802.11, or Bluetooth, battery options, and warranty or support coverage. The user does not have to know the model name, brand name or manufacturer name as would be needed for an ordinary keyword or unstructured search. The graphical user interface adaptively reacts to user input and presents data input fields in response to user input. As the user inputs data related to a laptop computer's specifications, the graphical user interface generates commonly associated data fields in order to further guide the user in formulating a structured query. For example, as the user populates the data input field "operating system" with the entry "OS X v10.5.4 Leopard," the interface immediately generates radio buttons with the choices, "MacBook," "MacBook Pro," or "MacBook Air," as the given laptop computers available with the specified operating system.

In another embodiment of the structured search, the user searches for a particular professional service or information service based upon qualitative and quantitative characteristics. For example, in formulating a structured search for a financial services firm, the user enters asset management, hedge fund management, and stock brokers, with conservative asset allocation, and high diversification. As the user populates the data field "conservative asset allocation," the graphical user interface immediately generates data fields with the choices "stocks," "bonds," "real-estate," and "commodities." The user is then able to input which types of assets the financial services firm is to cover.

Upon successful entry of a number of technical features and specifications, the user formulates a structured query with the graphical user interface. Thereafter, the structured query is processed and executed against a specially created and maintained database 120 and 122 or, in the general case against multiple heterogeneous data sources. The specially created and maintained database is built and maintained by pulling all instances of a particular good or service in e-commerce from information available on the internet and world wide web. Additionally, agreements may be made with third-party information providers or commercial entities in order to access particular databases of structured data for querying. For example, an agreement may be made with Amazon.com in order to download to a specially maintained database, all the instances of laptop computers available for sale and their particular sets of specifications and technical features.

Upon successful execution of the structured query and structured search, the shortlist of goods and services is generated. The shortlist is presented via the graphical user interface in a format that allows comparison of identities of the goods and services queried for. In accordance with the example above of searching for a laptop computer, the shortlist generated will contain a group of laptop computers which contain the desired technical features and specifications. Also, in accordance with the example above in searching for a financial services firm, the shortlist generated will contain a group of firms which provide the desired qualitative and quantitative characteristics. In all instances if generating the shortlist, links are provided to the merchant or service provider's web page. With the shortlist presented via the graphical user interface, the user may locate the best deal for a particular goods or services through comparison. Thereafter, the user may complete a purchase of the particular goods or services in e-commerce.

In at least one embodiment, the method and system for structured search of information includes a search for goods and services in mobile e-commerce. Typically, a structured search in mobile e-commerce is carried out via a handheld mobile telecommunications device, such as a cell phone, Blackberry, or iPhone, etc. In the scenario of mobile e-commerce, the structured search is particularly useful. An ordinary keyword or unstructured search will generate an overwhelmingly voluminous list of responses. Additionally, broadband connection speeds are slower with mobile telecommunications devices, thus further slowing the process by clogging data packets for transmission with superfluous, unneeded information. A keyword or unstructured search user never views all responses generated by the search. This problem is further compounded by the nature of mobile devices and user experience. Usually, a mobile device user has less time to sift through information due to the "on-the-go" nature of mobile users who generally need faster access to information. Also, mobile device screen sizes are smaller and not able to display the voluminous responses generated by an ordinary keyword or unstructured search.

The formulation of a structured query using a graphical interface on a mobile telecommunications device is accomplished by taking the user across multiple, page by page, presentations of data input fields. For example, in a structured search for a "hotel" the mobile device user is presented with a data field for entering the "location," then presented with a data field for entering "number of occupants," then "duration of stay," the "choice of amenities," such as existence and size of a water pool, WiFi Internet, etc. The graphical user interface of the mobile telecommunications device adaptively reacts to user input and presents data input fields and pages in response to user input. For example, in entering the data field of "location" with the entry "Las Vegas," the user is presented with the data fields, "deluxe room," "premium room," "industry suite," "fantasy suite," or "penthouse," etc. The user is then able to select which type of room and the desired amenities the structured query is to cover.

Upon formulation of the structured query, it is executed against a specially created and maintained database, or in the general case against multiple heterogeneous data sources. Databases may be specially built and maintained in order to better service mobile e-commerce users. The specially created databases are composed of structured data pulled from various internet and world wide web sources and also supplied by third-party data providers. A central database statistically analyzes the most common categories of structured data queried by mobile users and indexes this data to reduce search times and improve overall performance of structured searches by mobile users. Mobile user habits and trends for searching structured data are integrated into the execution of structured queries in order to provide higher relevancy structured search results.

For example, mobile users may be statistically likely to search for hotel accommodations when searching from a certain airport location and develop a clear trend of completing purchases for accommodations at a small group of hotels. The central database will record this structured data and incorporate it into the execution of future formulated queries of mobile users at that airport. In another scenario, mobile users may be likely to search for food and drink locations in the after work hours during the weekend. The central database will update structured data of statistical patterns mobile user queries in real-time and better provide up-to-date information to the mobile user.

In such an embodiment, mobile users across a telecommunications network may formulate queries for food and drink locations, with Mediterranean cuisine, wine list, wait times of less than twenty minutes, and location within five miles, etc. The specially created database will be maintained in order to keep real-time data regarding the wait times and status of food and drink locations satisfying the mobile user's formulated query. The execution of the mobile user's formulated query against the special database will generate a shortlist of food and drink locations in regards to the user's particular qualitative and quantitative characteristics updated in real-time.

The graphical user interface of the mobile device will present the shortlist in a manner or format which allows comparison of the identities of food and drink locations. For example, food and drink locations may be simply listed as to price, rating, or distance. Particularly useful in mobile e-commerce, the mobile device graphical user interface will allow the user to directly communicate with the food and drink location or visit their website. In presenting the shortlist of structured search results, the mobile user is able to look for the best deal or most desired accommodation in real-time.

Although the principles of the structured search invention have been illustrated in the preferred embodiments of e-commerce and mobile e-commerce, it is intended that the principles of this invention also be applied to other applications, such as medical and healthcare information technology, social networking, market research, or bioinformatics.

Thus, the foregoing described embodiments of the invention are provided as an illustration and description. It is not intended to limit the invention in precise form described. Other variations and embodiments are possible in light of the above teaching, and it is thus intended that the scope of the invention not be limited by the detailed description, but rather by the claims that follow.

What is claimed is:

1. A method for structured search of information, the method comprising the steps of:
  locating the right query objects for user needs;
  using said query objects to formulate a structured query, wherein said query objects comprise other query objects, and are structured hierarchically in multi-level, non-atomic data structures comprising string, numerical, symbolic, or video data;

executing said structured query against a specially created and maintained database of particular merchandise or service structured data, or in the general case, across multiple heterogeneous data sources;
generating a shortlist of identities of goods or services;
ordering said shortlist of goods or services as specified by said structured query; and
presenting said shortlist in order to compare said identities of goods or services.

2. The method of claim 1 wherein said structured search of information includes a search for goods and services in e-commerce and wherein said presenting said shortlist includes advertisements accurately targeted in response to said structured query.

3. The method of claim 1 wherein said structured search of information includes a search for goods and services in mobile e-commerce via a handheld mobile telecommunications device.

4. The method of claim 1 wherein said query objects further comprises a representation of a structured query to a data source, wherein said structured query is independent of the schema of the data source.

5. The method of claim 1 wherein said structured query is reformulated into a reformulated query using an exemplary structured query language prior to executing said structured query against a specially created and maintained database of particular merchandise or service structured data, or in the general case, across multiple heterogeneous data sources.

6. The method of claim 1 wherein sub-queries are derived from said structured query using a thesaurus and wherein said sub-queries are utilized in executing said structured query against a specially created and maintained database of particular merchandise or service structured data, or in the general case, across multiple heterogeneous data sources.

7. A method for structured search of information, the method comprising the steps of:
locating the right query objects;
using said query objects in formulating a structured query, wherein said query objects comprise other query objects, and are structured hierarchically in multi-level, non-atomic data structures comprising string, numerical, symbolic, or video data;
executing said structured query against a data source;
generating a shortlist;
ordering said shortlist; and
presenting said shortlist.

8. The method of claim 7 wherein said data source comprises a specially created and maintained database of particular merchandise or service structured data or multiple heterogeneous data sources.

9. The method of claim 7 wherein said shortlist comprises identities of goods or services.

10. The method of claim 7 wherein said query objects comprise a representation of a structured query to a data source that is independent of the schema of the data source.

11. The method of claim 7 wherein said structured query is reformulated into a reformulated query using an exemplary structured query language prior to executing said structured query against said data source.

12. The method of claim 7 wherein metaobjects are included into said query objects in order to facilitate the querying of query objects using said metaobjects.

13. The method of claim 7 wherein sub-queries are derived from said structured query using a thesaurus and wherein said sub-queries are utilized in executing said structured query against said data source.

14. A system for structured search of information, the system comprising:
a computer for locating the right query objects for user needs;
a graphical user interface for using said query objects to formulate a structured query, wherein said query objects comprise other query objects, and are structured hierarchically in multi-level, non-atomic data structures comprising string, numerical, symbolic, or video data;
wherein said computer executes said structured query against a specially created and maintained database of particular merchandise or service structured data, or in the general case, across multiple heterogeneous data sources;
wherein said computer generates a shortlist of identities of goods or services;
wherein said computer orders said shortlist of goods or services as specified by said structured query; and
wherein said graphical user interface presents said shortlist in order to compare said identities of goods or services.

15. The system of claim 14 wherein said structured search of information includes a search for goods and services in e-commerce and wherein said graphical user interface includes advertisements accurately targeted in response to said structured query.

16. The system of claim 14 wherein said structured search of information includes a search for goods and services in mobile e-commerce via a handheld mobile telecommunications device.

17. The system of claim 14 wherein said query objects further comprises a representation of a structured query to a data source, wherein said structured query is independent of the schema of the data source.

18. The system of claim 14 wherein said structured query is reformulated into a reformulated query using an exemplary structured query language prior to searching said database or multiple heterogeneous data sources.

19. The system of claim 14 wherein sub-queries are derived from said structured query using a thesaurus and wherein said sub-queries are utilized in executing said structured query against a specially created and maintained database of particular merchandise or service structured data, or in the general case, across multiple heterogeneous data sources.

20. The system of claim 14 wherein metaobjects are included into said query object in order to facilitate the querying of query objects using standard metaobject instances.

\* \* \* \* \*